INVENTOR
Kasturi L. Chopra

INVENTOR
Kasturi L. Chopra 3,463,667
Patented Aug. 26, 1969

3,463,667

DEPOSITION OF THIN FILMS

Kasturi L. Chopra, Lexington, Mass., assignor to Kennecott Copper Corporation, New York, N.Y., a corporation of New York Filed Dec. 3, 1965, Ser. No. 511,490
Int. Cl. B44d *5/00;* H01b *1/08*
U.S. Cl. 117—213 12 Claims

ABSTRACT OF THE DISCLOSURE

In the formation of thin non-metallic films by vacuum deposition, the application of an electric field in the plane of the substrate surface induces coalition of the particles producing a thin film of increased crystallinity.

This invention relates to articles that have deposited on at least one surface thereof one or more thin films of non-metallic material, and to processes for forming the same. More particularly, this invention is concerned with articles comprising a substrate having deposited upon at least one surface thereof a thin, continuous film of a non-metallic material such as, for example, a semiconductor, and to processes for making the same.

The many electronic application and coated-optical applications for thin films have stimulated interest in the preparation of such films by vacuum techniques. The two most common vacuum deposition techniques are evaporation and sputtering.

The term "evaporation" encompasses many methods for thermally evaporating a substance onto a substrate. A variety of methods are employed for heating the substance to accomplish evaporation, including, for example, electrical resistance heating, induction heating, electron bombardment, and flash evaporation by a laser beam. The term "sputtering" refers to bombardment methods that involve, usually, the creation of a plasma in an inert gas.

Both methods utilize extremely low pressures. Ordinarily, these processes are conducted under pressures at least as low as are commonly called, "high vacuum." This term is used herein to refer to pressures of 100 microns or lower, preferably, one micron or less. Frequently, ultrahigh vacuum is employed, in which much lower pressures are produced by special techniques.

As a material is deposited in the form of a thin film, on a substrate surface, the film tends to follow a particular form of growth. The material first nucleates at preferred sites on the substrate surface. As more material deposits, the nuclei develop and form islands, that gradually extend themselves both laterally and vertically. Eventually, the islands coalesce to form a two-dimensional thin film. The continuity, thickness, and purity of the film depend upon the conditions obtaining during deposition.

One object of the present invention is to provide substrate-supported films of non-metallic materials, that are thinner than such films previously available by vacuum deposition techniques. A related object of the invention is to provide new and practical processes for producing such items.

Another object of the invention is to provide thin films of non-metallic materials on substrate surfaces that are characterized by enhanced crystallinity. A related object of the invention is to provide new and practical processes for producing such films.

A more specific object of the invention is to provide a practical process for producing a thin film of a semiconducting material on a substrate surface.

A further object of the invention is to provide a new, practical process for the production of both polycrystalline and single crystal thin films, with a relatively smaller number of structural defects than has been possible in the past.

Another similar object of the invention is to provide a process that permits the preparation of highly oriented films of non-metallic material, that are characterized by a relatively small number of structural defects.

Other objects of the invention will be apparent hereinafter from the specification and from the recital of the appended claims.

Figure 1:
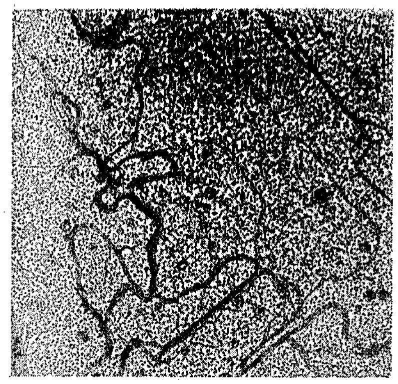
FIG. 1 is a photograph taken with an electron microscope, at an enlargement of 25,000 times, of a thin film of germanium that has been deposited upon a substrate surface by conventional thermal evaporation technique under high vacuum, with the substrate surface maintained at a temperature of 350° C.
Figure 5:
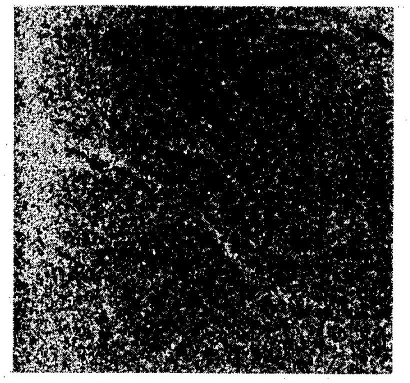
FIG. 5 is a photograph taken with an electron microscope, at an enlargement of 25,000 times, of a thin film of cadmium sulfide that has been deposited upon a substrate surface by conventional thermal evaporation technique under high vacuum, with the substrate surface maintained at a temperature of 300° K.
Figure 7:
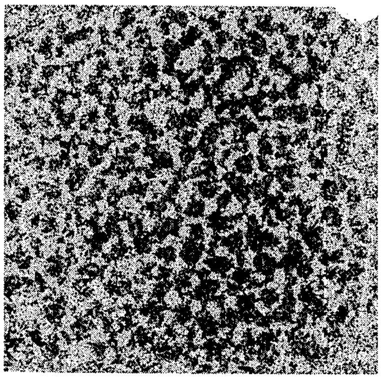
Figure 8:
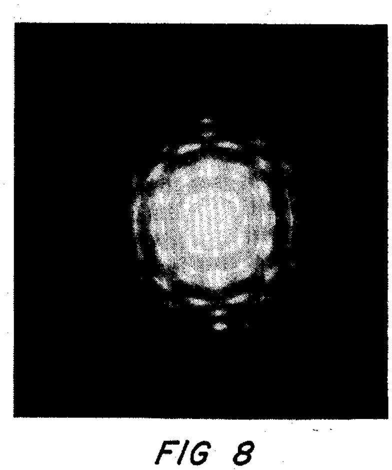

FIG. 7 is a reproduction of a photograph taken by means of an electron microscope, at the same enlargement as FIG. 1, but of a film of cadmium sulfide deposited by the same technique as was employed in the case of the film of FIG. 5, but with the application of a DC electric field of 300 volts per cm. in the plane of the film, during deposition, and FIG. 8 is a reproduction of an electron diffraction pattern thereof.

The present invention is based upon the discovery that if an electrical field is applied in the plane of the substrate surface upon which the film is to be deposited, during vacuum deposition of a non-metallic material on the substrate surface, the deposition on the substrate surface is modified in several respects. The effects that are observed depend upon the particular material that is being deposited in the form of a thin film, upon the applied voltage, the temperature, pressure, and similar factors. Generally speaking, however, it is common to observe an increase in crystallinity. With certain materials, such as, for example, germanium, it is usually common to observe an increased regularity of structure and a reduction in the number of defects.

Thin films may be made in accordance with the invention using conventional vacuum evaporation methods and equipment, with the addition of a pair or more of spaced electrodes that are applied to the substrate surface, for the production of an electric field across the surface. Ordinarily, the electric field is produced by the application of DC voltage. Preferably, a voltage of about 100 volts per centimeter is applied, although the effect of the field is realized at both lower and higher voltage levels.

The substrate, to which the film is applied, may be any desired material. Suitable substrates include glass, mica, quartz, metallic surfaces, crystal surfaces, and the surfaces of non-metallic materials such as, for example, metallic oxides, metallic halides, and the like.

In order to demonstrate the invention, the surface of the substrate material, on which the film is to be deposited, is provided with a pair of spaced electrodes that may be applied in any convenient fashion, as, for example, by vacuum deposition, or by the application of a paint or other convenient vehicle. After the electrodes have been applied to the surface of the substrate, the substrate surface is placed under a vacuum, and an electrical potential is applied between the electrodes so that a voltage gradient is produced across the surface. The film is then deposited on the substrate surface, and the voltage gradient is maintained at the time the initial deposit is formed and during the remainder of the deposition.

The following demonstrations will further illustrate the invention.

EXAMPLE I

Deposition of a film of germanium

Utilizing a conventional bell jar vacuum chamber, germanium was thermally evaporated and deposited upon the surface of a substrate that was maintained, during the deposition period, at a temperature of approximately 350° C., under a vacuum of about $10^{-6}$ millimeters of mercury. During this initial deposition, ordinary thermal evaporation conditions were maintained as described above, in order to produce a germanium film under conventional conditions for comparison purposes. This film was examined under an electron microscope, as shown in FIG. 1, and its electron diffraction pattern was observed, as reproduced in FIG. 2.

Figure 3:
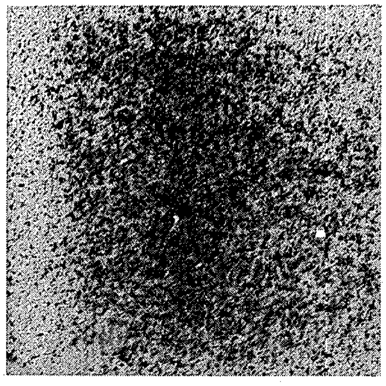
FIG. 3 is a reproduction of a photograph taken by means of an electron microscope, at the same enlargement as FIG. 1, but of a film of germanium deposited by the same technique as was employed in the case of the film of FIG. 1, but with the application of a DC electric field of 300 volts per cm. in the plane of the film, during deposition.
Figure 4:
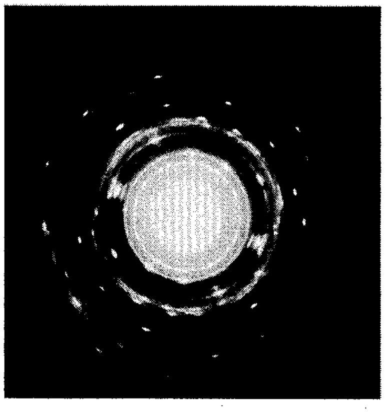
FIG. 4 is a reproduction of an electron diffraction pattern thereof.

A pair of electrodes were then painted upon the surface of a similar substrate. This substrate was placed in the bell jar, and the electrodes were connected to a bank of dry cells in series with a 100,000 ohm resistor, which provided a high impedance source. The deposition of germanium was then repeated under the same conditions previously employed, while the electric field was maintained across the surface of the substrate. The film formed in this manner was then examined in an electron microscope, as recorded in FIG. 3, and its electron diffraction pattern was observed, as shown in FIG. 4.

Figure 2:
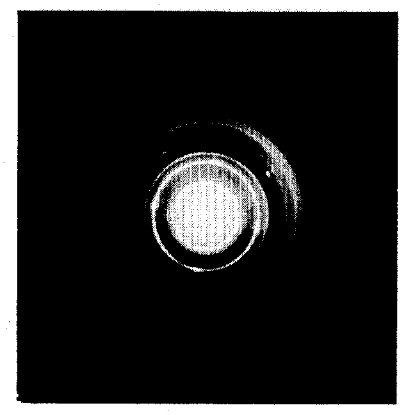
FIG. 2 is a reproduction of an electron diffraction pattern thereof.

As FIG. 2 indicates, under conventional thermal evaporation conditions, the deposited film of germanium is polycrystalline. However, as FIG. 4 indicates, a germanium film that is deposited in accordance with the present invention more closely approaches a single crystal.

When a germanium film is deposited in accordance with the invention, on a substrate that is maintained at a temperature of less than about 300° C., the deposit tends to be more amorphous. At temperatures above 300° C., however, the influence of the electric field upon the coalescence of the initial very small particles, and upon subsequent recrystallization, is marked and more dramatic.

EXAMPLE II

Deposition of a film of cadmium sulfide

Following the procedure of Example I, a film of cadmium sulfide was deposited upon a substrate surface, with the substrate at a temperature of approximately 300° K., both in accordance with conventional practice, and in accordance with the invention, with the application of a DC field across the substrate surface, during deposition, of approximately 300 volts per cm.

Figure 6:
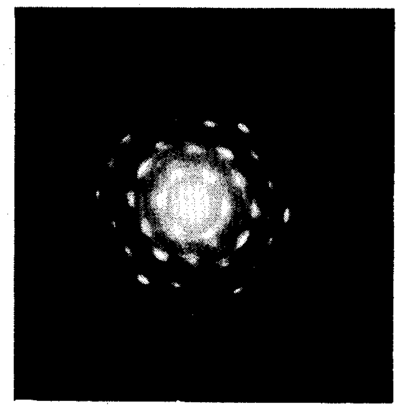
FIG. 6 is a reproduction of an electron diffraction pattern thereof.

The conventionally-deposited film of cadmium sulfide was then observed in an electron microscope, as reproduced in FIG. 5, and the electron diffraction pattern was recorded as reproduced in FIG. 6. A film of cadmium sulfide produced in accordance with the present invention was then observed in an electron microscope, as indicated in FIG. 7 and the electron diffraction pattern was photographed, as reproduced in FIG. 8. In both cases, the substrate employed was rock salt.

Under conventional conditions, the film produced has a hexagonal structure. The film produced in accordance with the present invention indicates that dendric growth has occurred, and that a cubic structure has been obtained, apparently due to recrystallization.

The two demonstrations of the invention show that the practice of the present invention produces a rearrangement of atoms in the deposited film. In the case of cadmium sulfide, this is, at least in part, due to recrystallization, which is known to cause this kind of polymorphic transformation at higher temperatures.

GENERAL

In the practice of the present invention, the deposit that initially forms, under the influence of the applied electric field, appears to have something of a seeding effect upon the material that is subsequently deposited, whereby the initial orientation and crystallinity in the final film is influenced. The initial deposit thus appears to create a lattice that apparently controls the crystal structure of additional material that is deposited subsequently.

By observing the rate and amount of deposition during the practice of the process of the present invention, it has been established that the films that are produced become substantially continuous at film thicknesses as low as about 50 A. By way of comparison, films deposited by conventional thermal evaporation techniques do not become substantially continuous until a thickness of approximately 100 A. has been attained. The application of the electric field, in accordance with the present invention across the plane of the substrate surface, during deposition, initiates coalescence of the initial island-like structures at an earlier stage than is normally observed with conventional thermal evaporation and deposition techniques. This phenomenon, together with the enhanced orientation effects, are characteristic features obtained by the practice of the present invention.

Generalization as to the non-metallic materials, that may be employed to form the film, is difficult. For example, films of germanium, cadmium sulfide, and barium oxides, produced in accordance with the present invention, represent three different classes of non-metallic materials. The effects produced in accordance with the present invention can also be observed in films of silicon, cadmium telluride, lead oxide, potassium chloride, lead sulfide, lead telluride, zinc oxide, sodium chloride, and lithium chloride, by way of example.

One of the valuable applications of the present invention is in the production of recrystallization and reorientation in films of semiconductor materials, thereby influencing the electronic properties.

Alternating current fields may also be employed, in the practice of the invention, to achieve certain of the advantageous effects, particularly with films of increased electrical conductivity. Such fields, however, do not ordinarily produce completely oriented crystal structures.

I claim:

1. In the process of forming a film of a non-metallic material on a substrate surface in which the non-metallic material is caused to deposit by a condensation process on the surface, the improvement which comprises, coalescing said deposited material by applying an electric field to and in the plane of substrate surface at the time the material is initially deposited.

2. A process in accordance with claim 1 wherein the electric field is maintained across the substrate surface until a continuous film is formed.

3. The process of claim 1 including the further step of simultaneously heating the substrate surface and film.

4. The process of forming a non-metallic film by depositing non-metallic material on a substrate surface comprising, maintaining the substrate under at least a high vacuum,
depositing a film of non-metallic material on a surface of said substrate under said vacuum, and
coalescing said deposited material by applying an electric field to and in the plane of said substrate surface at least at the time the material is initially deposited.

5. A process in accordance with claim 4 wherein said electric field is maintained across the substrate surface at least until a continuous film is formed.

6. A process in accordance with claim 5 and including the further step of simultaneously heating the substrate surface and film.

7. A process in accordance with claim 4 wherein the step of depositing the film is a sputtering process.

8. A process in accordance with claim 4 wherein the step of depositing the film is an evaporation process.

9. An article of manufacture comprising a substrate that has deposited on at least one surface thereof a film of a non-metallic material selected from the group consisting of silicon, germanium, cadmium sulfide, cadmium telluride, barium oxide, lead oxide, potassium chloride, lead sulfide, lead telluride, zinc oxide, sodium chloride and lithium chloride, and wherein said film is continuous film having a thickness of less than about 50 A.

10. A process for forming a deposited film of a non-metallic material on a surface of an electrically insulating substrate, comprising maintaining said substrate surface under a pressure of one micron or less, applying an electric field of at least about 100 volts/cm. to and in the plane of said substrate surface, heating said substrate surface to a temperature of at least 100° C., and depositing said material on said surface while maintaining said field at said surface.

11. A process in accordance with claim 10 wherein said material is a semiconductor.

12. A process in accordance with claim 10 wherein said material is a member selected from the group consisting of silicon, germanium, cadmium sulfide, cadmium telluride, barium oxides, lead oxide, potassium chloride, lead sulfide, lead telluride, zinc oxide, sodium chloride, and lithium chloride.

References Cited

UNITED STATES PATENTS

| | | | |
|---|---|---|---|
| 2,978,364 | 4/1961 | Blaustein | 117—227 |
| 2,880,119 | 3/1959 | Floyd | 117—106 X |
| 3,203,830 | 8/1965 | Ostrander et al. | 117—127 |
| 3,367,795 | 2/1968 | Stutzman | 338—308 |
| 2,999,766 | 9/1961 | Ashworth et al. | 117—107 X |
| 3,100,723 | 8/1963 | Weed | 117—93 X |
| 3,069,286 | 12/1962 | Hall | 117—93 |

WILLIAM L. JARVIS, Primary Examiner

U.S. Cl. X.R.

117—93, 106, 107, 223, 227